Jan. 30, 1962 R. L. WARD 3,018,961

ARITHMETIC SWITCHING CIRCUIT

Filed Dec. 30, 1958 7 Sheets-Sheet 1

INVENTOR
ROBERT L. WARD

BY William V. Schelberg
AGENT

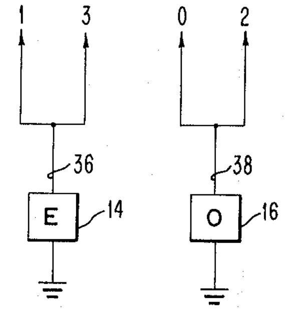
FIG. 5
| A | $\bar{A}$ | B | $\bar{B}$ | $C_p$ | E | 0 |
|---|---|---|---|---|---|---|
| X | | X | | | X | |
| X | | | X | | | X |
| | X | X | | | | X |
| | X | | X | | X | |
| X | | X | | X | | X |
| X | | | X | X | X | |
| | X | X | | X | X | |
| | X | | X | X | | X |
FIG. 6
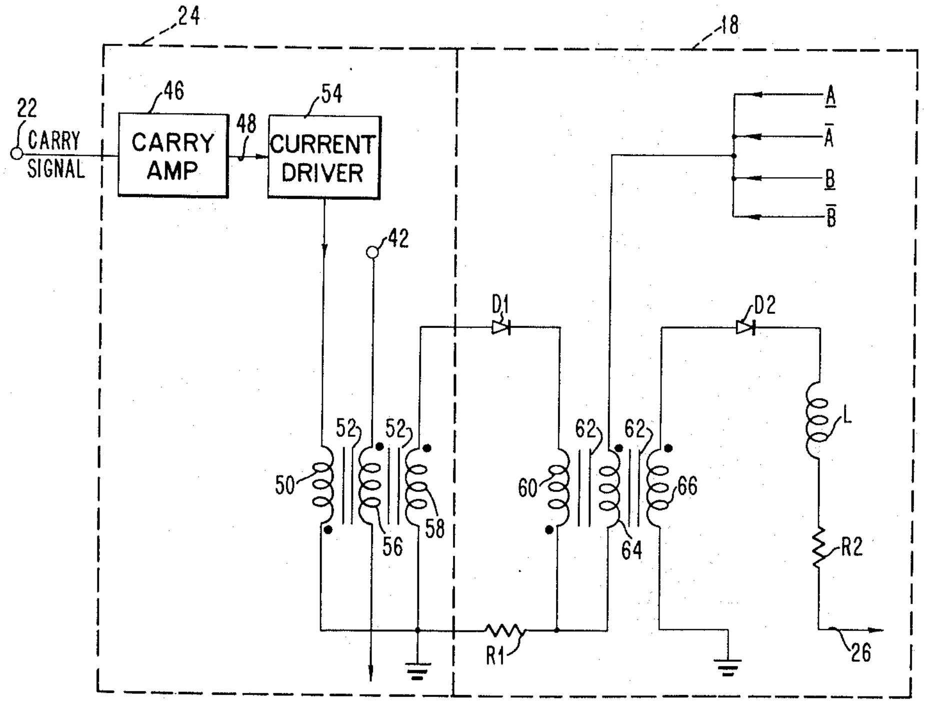
FIG. 4

Jan. 30, 1962 R. L. WARD 3,018,961

ARITHMETIC SWITCHING CIRCUIT

Filed Dec. 30, 1958 7 Sheets-Sheet 7

United States Patent Office 3,018,961

Patented Jan. 30, 1962

3,018,961

ARITHMETIC SWITCHING CIRCUIT

Robert L. Ward, Yorktown Heights, N.Y., assignor to International Business Machines Corporation, New York, N.Y., a corporation of New York Filed Dec. 30, 1958, Ser. No. 783,807

25 Claims. (Cl. 235—176)

This invention relates to switching circuits and more particularly to switching circuits capable of performing arithmetic operations on information input signals wherein the input signals are employed both to manifest a plurality of output signals and to determine which of these output signals are to be utilized.

Heretofore switching circuits employing bistable devices such as relays, tubes, magnetic cores, cryogenic elements and the like wherein arithmetic operations are performed, have utilized information input signals to select one or a plurality of such devices to provide one output signal. No further use has been made of such information input signals other than this selection technique and the input drive lines have thus been terminated in ground. It has been found, however, that greater flexibility and/or simplicity of overall operation may be realized by employing the information input lines to both accomplish a desired function in an original switching circuit and by bussing together the return path connectors of the input lines in an arbitrary fashion employing them as inputs for logical networks whose outputs may be combined with the outputs of the original circuit.

The concept of this novel mode of utilizing the return path connectors of an original circuit is best illustrated by way of a system which provides serial addition of input signals. The novel adder, according to the principles of this invention, employs a matrix of $R^2$ bistable devices, such as bistable magnetic cores, where R is the system radix. A first group of R input lines for manifesting a first number to be added, is coupled to the devices of the matrix and a second group of R input lines, for manifesting a second number to be added, is also coupled to the devices of the matrix. The input lines of the first and second group, after coupling the devices of the matrix, are bussed together to form a first set of odd-even common input drive lines and a second set of odd-even common input drive lines. The sets of odd-even common input lines are then utilized as inputs to various logical stages to activate either an odd logic or an even logic stage and a carry logic stage. The matrix of $R^2$ bistable devices is provided with R output sense lines which are bussed at one end to form a sense even bus and a sense odd bus which are connected to the output lines of the odd and even logic stages, respectively. Upon energization of the first and second groups of R input lines, an output signal indicative of the sum of the numbers to be added is provided on one of the R output sense lines and an output signal indicative of the sum of the numbers to be added plus one is provided on another of the R output sense lines. Thus in every addition the sense even bus and the sense odd bus are energized. The odd and even logic stages of the adder are energized by the sets of common input lines along with a carry indication from the last addition to activate one of these logic stages and provide an inhibiting signal on one of the sense busses to select which of the plurality of outputs provided is to be utilized.

Accordingly, a prime object of this invention is to provide a novel device for utilizing information input signals to a higher degree than heretofore contemplated.

A further object of this invention is to provide a novel device wherein input signals thereto are employed to develop output signals indicative of a desired function of the input information and also to determine which one of a plurality of output signals that are developed is to be utilized.

Another object of this invention is to provide a novel sequentially operated adder.

Still another object of this invention is to provide a sequentially operated adder which simultaneously manifests a sum and a sum plus one output signal in each sequence of operation and negates one of the output signals depending upon a carry from the previous addition.

Other objects of this invention will be pointed out in the following description and claims and illustrated in the accompanying drawings, which disclose, by way of example, the principle of the invention and the best mode, which has been contemplated of applying that principle.

In the drawings:

FIG. 1 illustrates a system diagram for an adder in accordance with this invention.

FIG. 2*a* illustrates a circuit diagram of one embodiment of the matrix of FIG. 1 in accordance with this invention.

FIG. 2*b* illustrates a circuit diagram of another embodiment of the matrix of FIG. 1.

FIG. 3*a* is a circuit diagram of the carry sense line of the FIG. 2*a*.

FIG. 3*b* is a circuit diagram of the carry sense line of the FIG. 2*b*.

FIG. 4 is a circuit diagram of the carry delay and driver stages of the FIG. 1.

FIG. 5 illustrates the manner in which the output sense lines of the matrix of FIG. 1 are connected to the even and odd logic stages.

FIG. 6 is a truth table depicting when the even or odd logic stages of FIG. 1 are activated.

Figure 7:
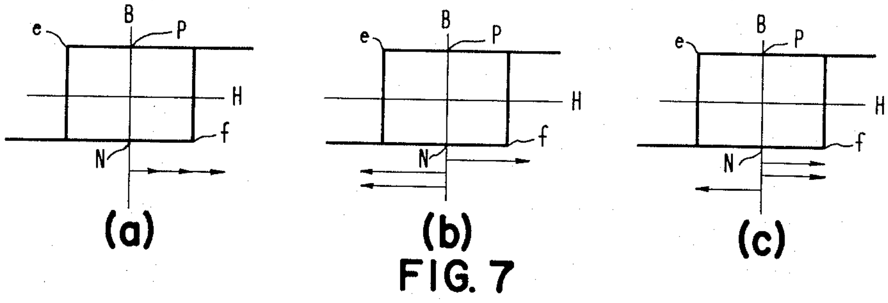

FIG. 7 consisting of FIGS. 7*a*, *b*, and *c* illustrate an idealized hysteresis characteristic of the type material employed and different modes by which the material may be switched from one to another of its stable states.

Figure 1:
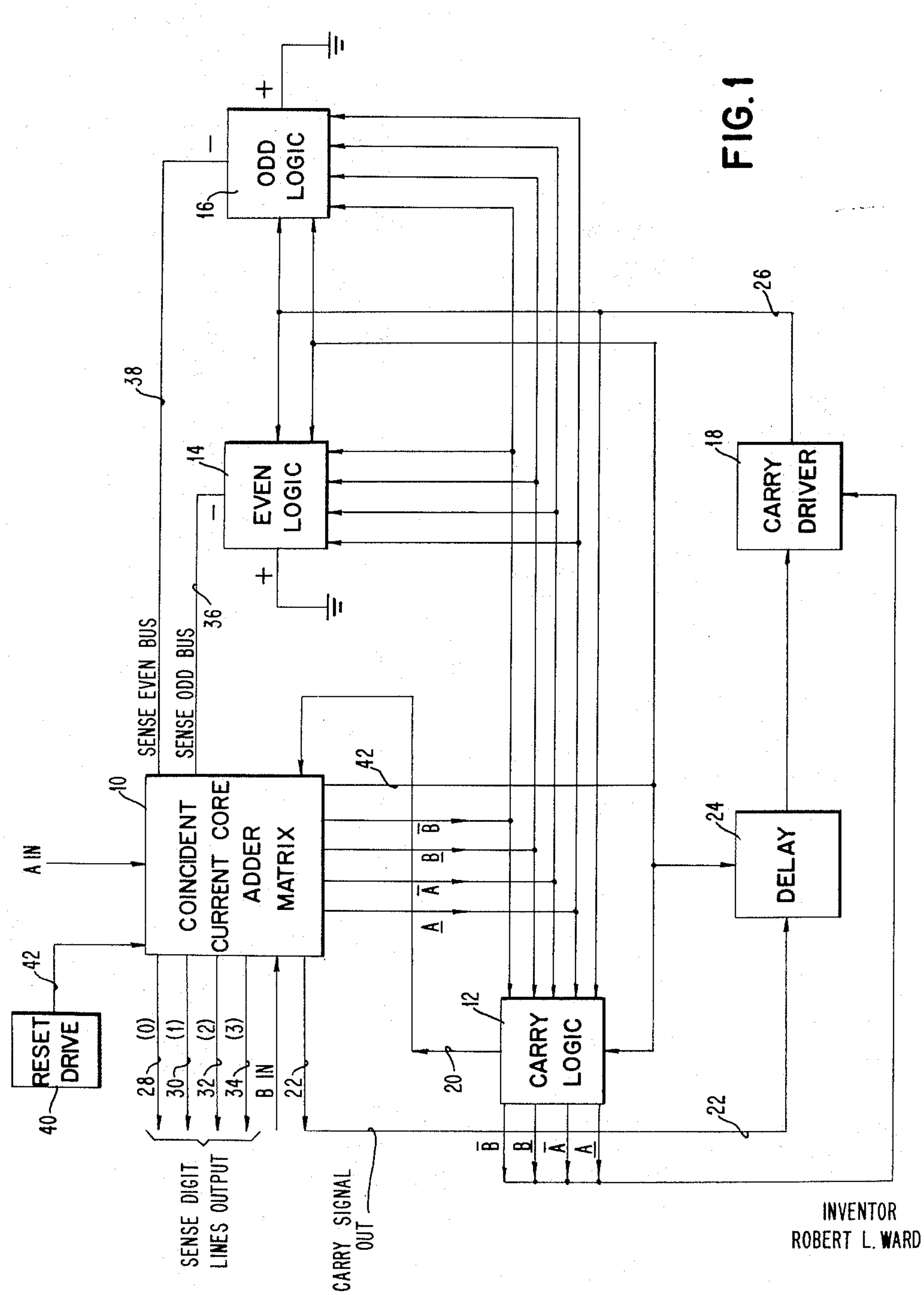
Figure 8:
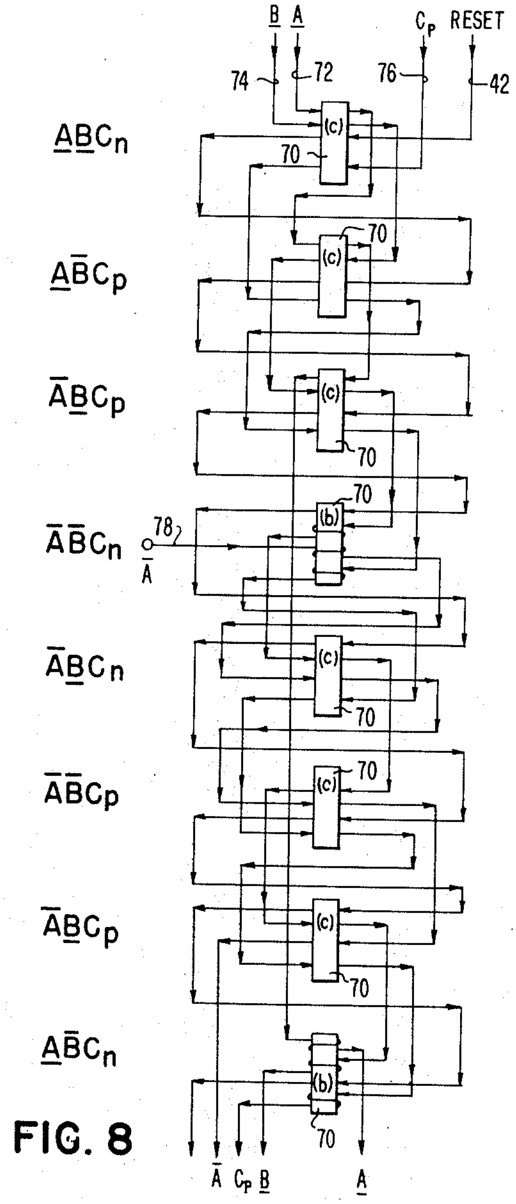

FIG. 8 is a circuit diagram illustrating one embodiment of the even, odd and carry logic stages of FIG. 1, wherein toroidal ferrite cores are employed.

Figure 9:
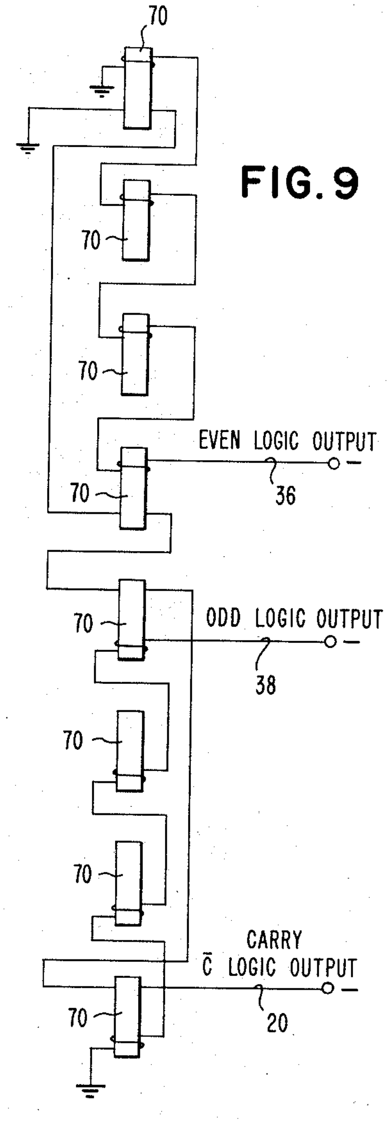

FIG. 9 is a circuit diagram of the output lines of the FIG. 8.

Figure 10:
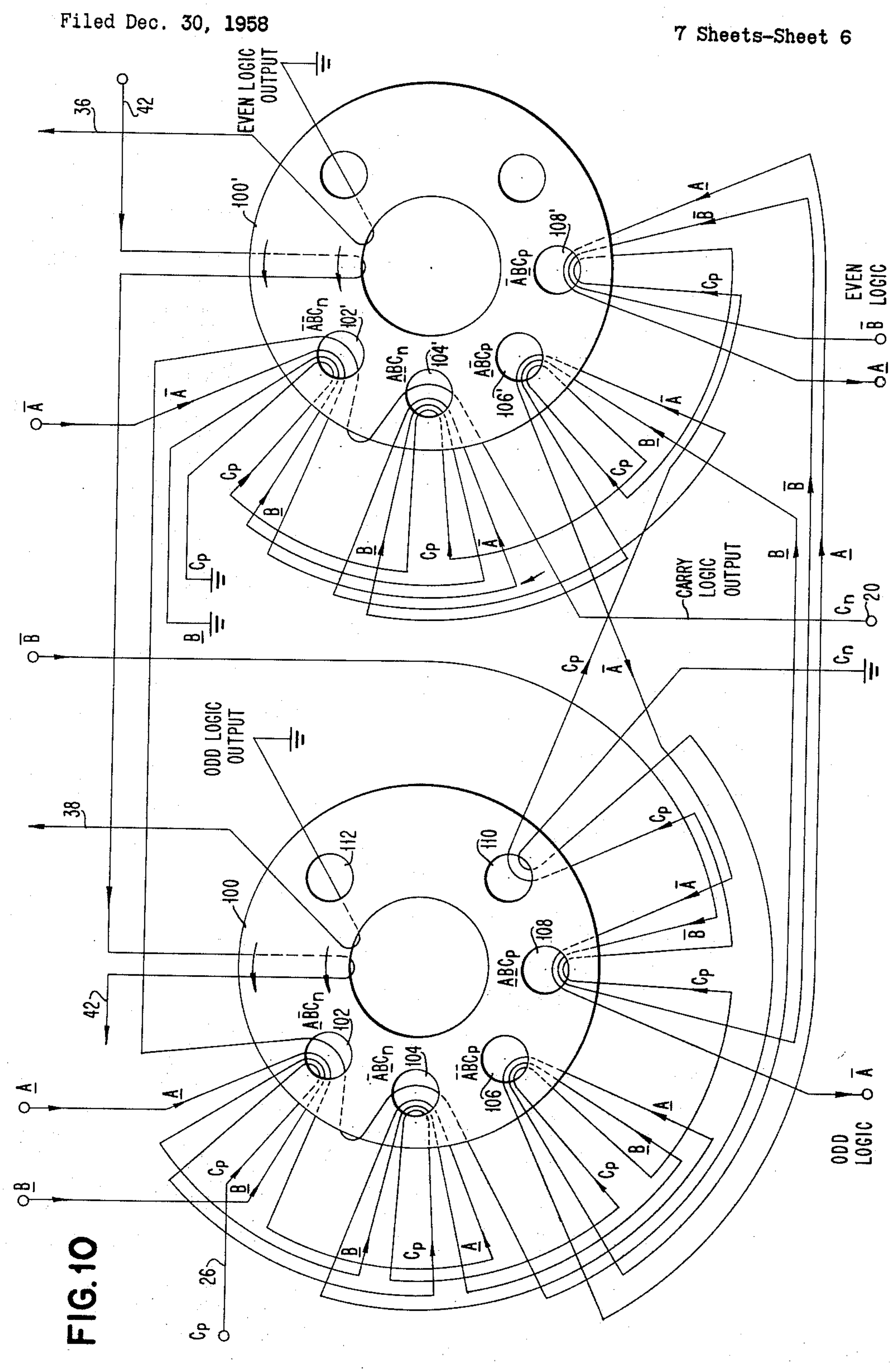

FIG. 10 is a circuit diagram of another embodiment of the even, odd and carry logic stages of FIG. 1, wherein magnetic multipath cores are employed.

Figure 11:
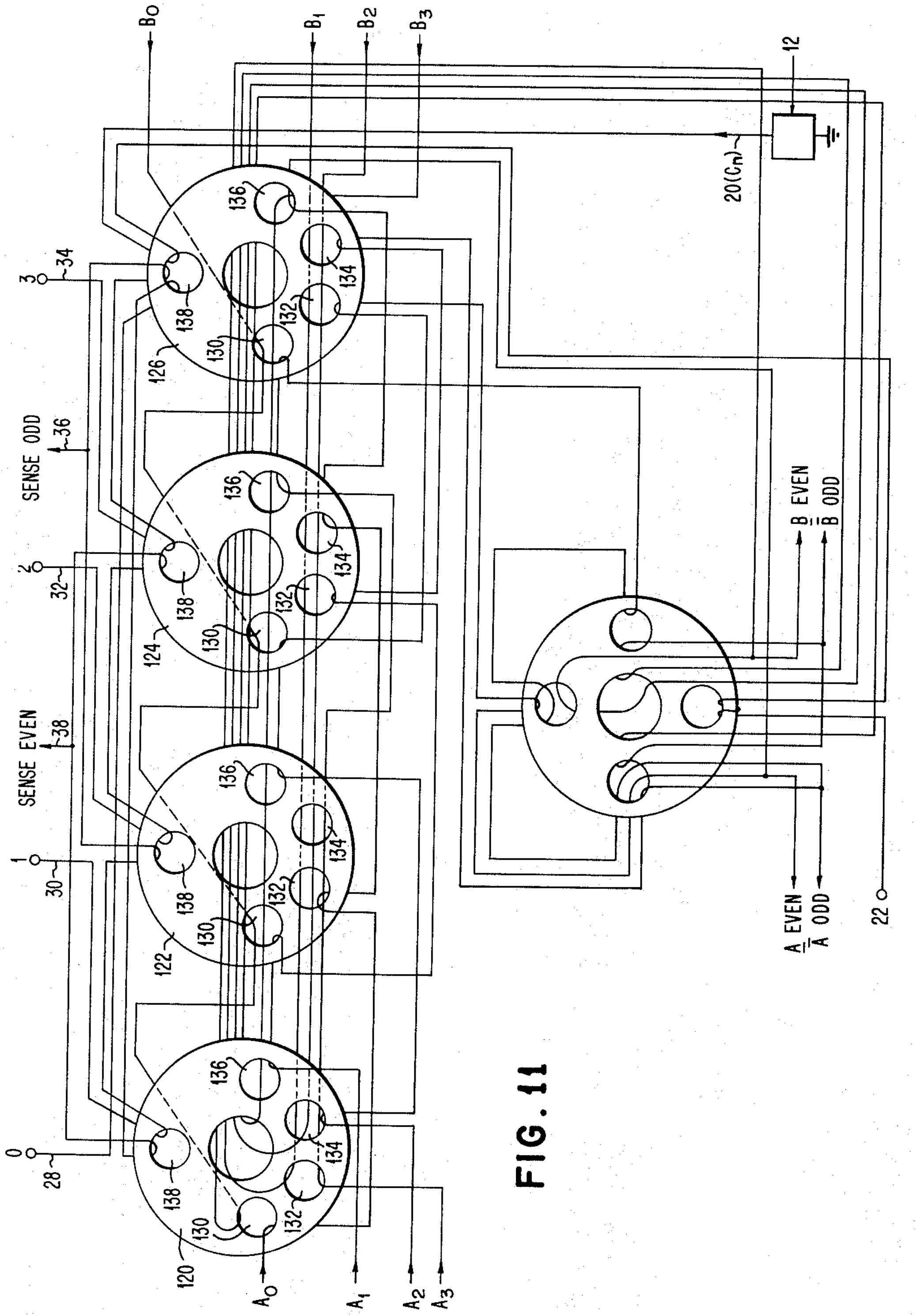

FIG. 11 is a circuit diagram of another embodiment of the matrix of FIG. 1 wherein magnetic multipath cores are employed.

Referring to the FIG. 1, a matrix 10 is provided which may comprise $R^2$ bistable magnetic cores, where R is the system radix, wherein either the normal coincident current or coincident flux principle of bit selection, familiar to those versed in the art, is employed. A first input A and a second input B to the matrix 10 are each manifested by R drive lines here representing an even radix four for ease of presentation and understanding. The selected drive lines of the inputs A and B, which are normally grounded, are here recognized to contain information that can be employed in further logical networks by grouping the inputs after exit from the matrix in a desired manner to generate additional useful information. Accordingly, the even and odd drive lines of each input number, A and B, are independently bussed to provide a drive input line A (even), a drive input line A (odd), a drive input line B (even) and B (odd). In order to differentiate between the even and odd input drive lines a bar is placed over the input character to denote odd and a bar under the character to denote even. Thus the drives are indicated as $\underline{A}$, $\overline{A}$, $\underline{B}$ and $\overline{B}$. The individual input drives, $\underline{A}$, $\overline{A}$, $\underline{B}$, $\overline{B}$ are then applied to a carry logic stage 12, an even logic stage 14 and an odd logic stage 16, and then bussed together and applied to a carry driver stage 18. An output line 20 is provided from the carry logic stage 12, which is connected to a carry sense line 22, through the matrix 10, which in turn is connected to a delay stage 24. The delay stage 24 is connected to the carry driver stage 18 having an output line 26 directed to the logical stages 12, 14 and 16. The matrix 10 is also provided with a number of sense lines which may correspond in number to the coded input radix $R=2n$, where $n$ is a digit, and are shown as a first output sense line 28, corresponding to a 0 code line, another output sense line 30, corresponding to a 1 code line, another output sense line 32, corresponding to a 2 code line and a sense output line 34 corresponding to a 3 code line for an arbitrary radix of four. One side of the sense digit output lines 28 and 32, 30 and 34, corresponding to the even and odd sense output lines, are bussed to an output line 36 of the logic stage 14 and an output line 38 of the logic stage 16, respectively.

When both the A and B input drive lines are selected, the matrix 10 provides a one-unit positive output pulse on two of the sense windings 28, 30, 32, or 34, one of which corresponds to the true sum of the input digits A and B, while the other corresponds to the next higher digit. One of the two output signals on the R output sense lines is selected by providing a cancelling negative pulse on either the line 36 or 38 from the even logic stage 14 or odd logic stage 16, respectively. The function of the stages 14 and 16 is to provide a cancelling pulse to the signal corresponding to the next higher digit when there is no carry from the previous addition, or to cancel the output corresponding to the true sum when there is a carry from the previous addition. The decision to energize one or the other logic stages 14 or 16 is based upon the driver inputs $\underline{A}$, $\overline{A}$, $\underline{B}$ and $\overline{B}$, and the existence or non-existence of a carry from the previous addition.

When both the input digits A and B have their selected drive lines energized, as set forth above, a carry signal is delivered via the carry sense line 22 if the combinations of inputs are equal to or greater than the radix R and when they are equal to R minus one $(R-1)$. When the combinations of inputs are equal to or greater than R, two units of positive voltage are induced on the carry sense line 22, while combinations equal to $(R-1)$ induce one unit of positive voltage on the line 22. The carry logic stage 12 functions to provide one unit of negative voltage on its output line 20 when there has been no carry from the previous addition. Thus the magnitude of an output on the carry line 22 may be $-1$, $0$, $+1$ or $+2$ units of voltage, depending upon the nature of the inputs A and B, and the presence or absence of a carry signal from the previous addition.

A reset current driver 40 having an output line 42, links each core in the matrix 10, each of the logical stages 12, 14 and 16, and provides a reset current pulse to the delay stage 24. Thus, the delay stage 24 is adapted to receive positive carry signals on the line 22 only, store this signal and then, upon application of a reset signal in the line 42, from the driver 40, retransmit this information carry signal to set the carry driver stage 18. The carry driver stage 18 then stores this information until read in of the inputs A and B for the next addition whereupon it is reset to provide an output on the line 26 to the logical stages 12, 14 and 16.

The system of FIG. 1 may then be considered as a matrix of bistable devices having input and output means coupled to each bistable device of the matrix and, upon energization of selected ones of the input means, two bistable devices of the matrix are actuated to coincidently provide a first output signal indicative of the true sum and a second output signal indicative of the true sum plus one with the provision for means responsive to the energization of the input means, here the logic stages 12, 14 and 16, coupled to the output means of the matrix, to inhibit one of the output signals. More specifically, this system may be further considered as having the provision of utilizing the information contained in the selected input means A and B by not only causing selection and actuation of a plurality of possible output manifestations, but grouping the inputs in combinatorial fashion to help perform other logic which selects the true output by the negation of those which are false. Such a system, as described above, requires one time increment to provide the A and B input signals which manifests the two possible outputs of true sum and true sum plus carry, a possible carry indication which is stored for the next addition operation and actuates the stages 12, 14 and 16 to provide negation of one of the outputs, while another time increment is employed to allow the system to be reset.

Figure 2A:
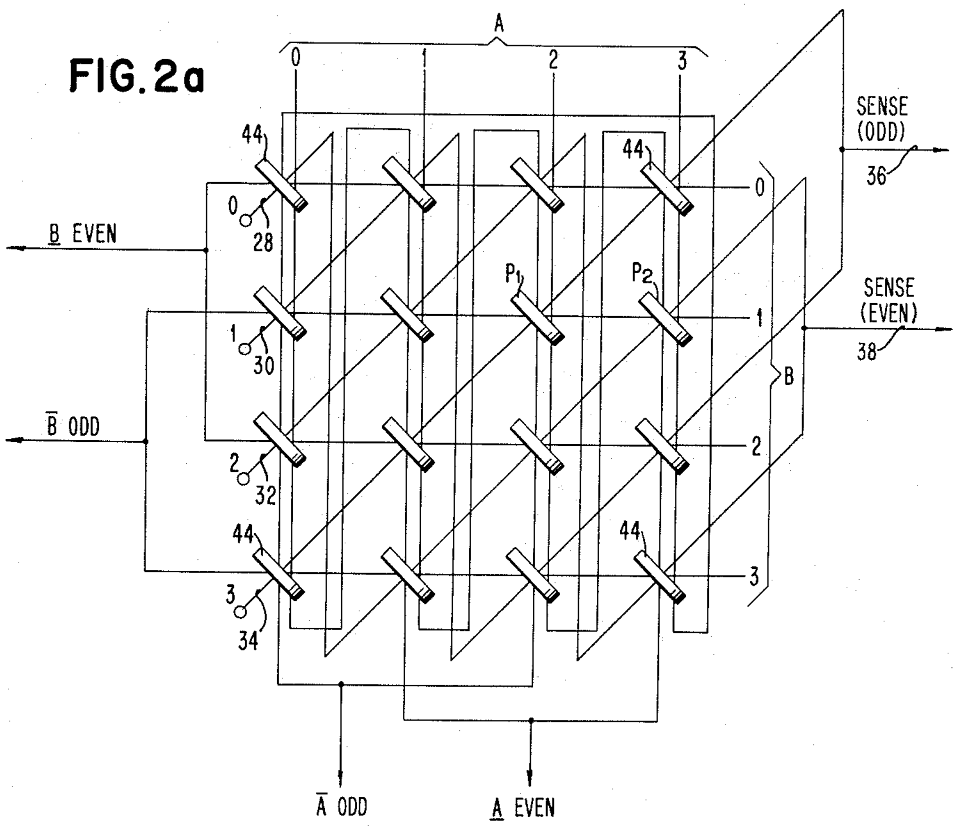

Referring to the FIG. 2*a*, one embodiment of the magnetic matrix 10, illustrated in block form in the FIG. 1, is shown in detail. A plurality of bistable magnetic cores 44 are arranged in columns and rows. The A and B inputs coded in a desired radix R, here the radix four, are manifested by input drive lines labeled $A_0$, $A_1$, $A_2$ and $A_3$ for the column drivers and $B_0$, $B_1$, $B_2$ and $B_3$ for the row drivers of the matrix 10. Each row drive line B, links the cores 44 in a corresponding row, with the odd drive lines $B_1$ and $B_3$ bussed to provide a single drive line $\overline{B}$ while similarly the even row drive lines $B_0$ and $B_2$ are bussed to provide a single drive line $\underline{B}$. Each column drive line A, links the cores 44 in the corresponding column and the next adjacent column, while the last drive line $A_3$ links the cores in its corresponding column and that column corresponding to the $A_0$ input drive lines. The even column drive lines $A_0$ and $A_2$ are bussed to provide a single drive line $\underline{A}$ while the odd column drive lines $A_1$ and $A_3$ are bussed to provide a single drive line $\overline{A}$. The matrix 10 is also provided with output sense lines 28, 30, 32 and 34 as shown in the FIG. 1 which link the cores 44, with the odd sense lines 30 and 34, terminating at one end and connected to the line 36, and the even sense lines 28 and 32, terminating at one end and connected to the line 38 in the FIG. 1.

Upon selection of the A and B drive lines, say the $A_1$ and the $B_2$ input drive lines, the cores 44 at the intersection of the row corresponding to the $B_2$ drive line and the columns corresponding to the $A_1$ and $A_2$ drive lines are coincidently energized and switched from a datum to an information representing stable state to induce a unit of positive voltage on the lines 28 and 34, each of which has one end terminating in the lines 36 and 38, respectively. It should be understood at this point and in the subsequent detailed description to follow, that when any input line A or B is activated, a closed circuit arrangement exists in that line to ground, while in the unactivated line connected thereto to make up the $\overline{A}$, $\underline{A}$, $\overline{B}$ or $\underline{B}$ common lines, an open circuit arrangement exists and any induced voltage therein need not be considered. Further, a positive voltage is induced on the lines 28 and 34 only, and not the remaining lines 30 and 32 which are common with the lines 28 and 34, respectively. Considering the core at position $A_1$ $B_2$ with the output line 34 coupled thereto, the core in switching appears as a voltage source. With the stage 14 in an unactivated state, this stage appears as a negligible impedance to ground. The only voltage which may appear in the common output line 30 is that appearing across the stage 14, and since the stage 14 is a negligible impedance, the voltage in line 30 is negligible. If, on the other hand, the stage 14 is activated, it appears as a voltage source of opposite polarity and the voltages are combined to perform negation of any output on either line 30 or 32. The same reasoning is then applied to the core at position $A_2$, $B_2$. Thus, upon selection of the $A_1$ and the $A_2$ input drive lines, the cores 44 at the intersection of the row corresponding to the $B_2$ drive line and the columns corresponding to the $A_1$ and $A_2$ drive lines are coincidently energized and switched as set forth above to induce a unit of positive voltage only on the lines 28 and 34, each of which had one end terminating in the lines 36 and 38, respectively. Simultaneously, the output drivers $\overline{A}$ and $\underline{B}$ are energized to provide inputs to the logical stages 12, 14 and 16 and a reset signal to the carry driver 18 of the FIG. 1. Thus, the true sum of the A and B inputs is manifested by an output signal on the sense line 34, while the next higher digit is manifested by an output on the sense line 28. The output in the line 28 must be accompanied with a possible carry operation, depending upon whether the previous addition included a carry. For ease of presentation and understanding, means for providing the carry operation of this matrix arrangement will be described in detail below with reference to the FIG. 3*a*.

Figure 2B:
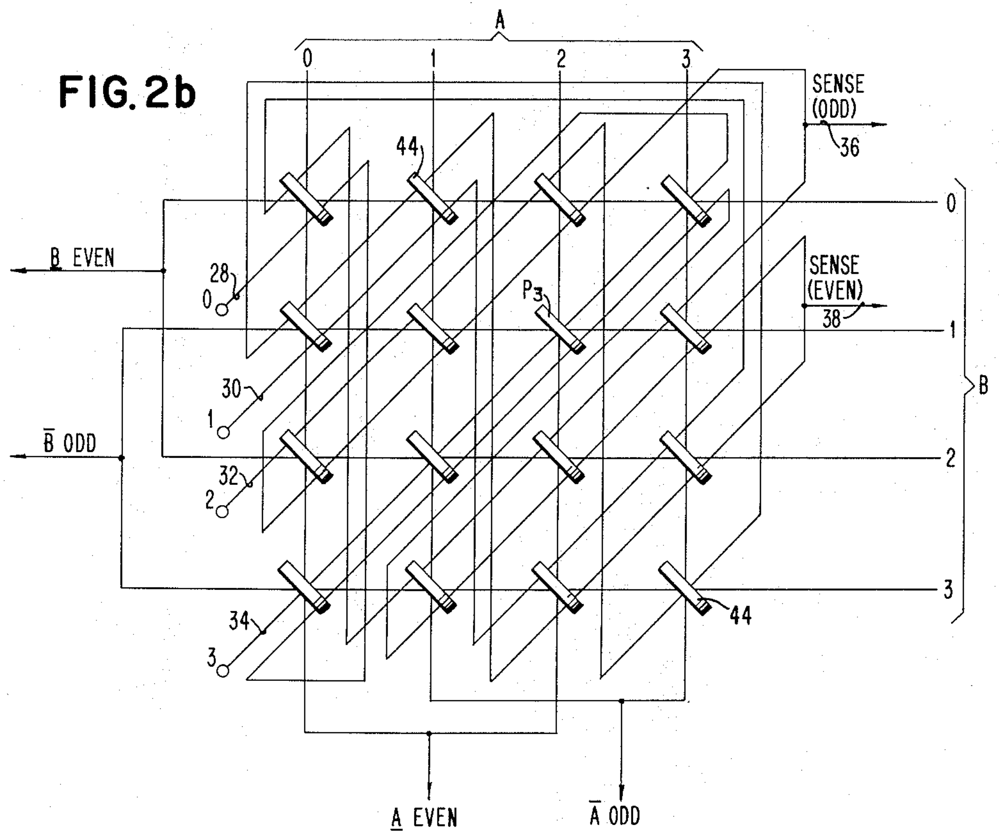

Referring to the FIG. 2*b*, another embodiment of the magnetic core matrix 10, illustrated in block form in the FIG. 1, is shown in detail. Again, a plurality of cores 44 are arranged in columns and rows with the B input drivers $B_0$, $B_1$, $B_2$ and $B_3$ linking each core in a corresponding row, as set forth in FIG. 2*a*, but with each column driver $A_0$, $A_1$, $A_2$ and $A_3$ only linking each core in a corresponding column. Each of the even and odd column and row drivers A and B are individually bussed to provide the output drivers $\underline{A}$, $\overline{A}$, $\underline{B}$ and $\overline{B}$. Thus this second embodiment simplifies the drive winding arrangement in that each drive winding links a column or row only once but necessarily complicates the linking arrangement for the sense lines 28, 30, 32 and 34. Each of the sense lines 28, 30, 32 and 34 links the cores 44 corresponding to combinations of inputs equal to one less than the digit it represents and the cores 44 corresponding to the combinations equal to the digit the winding represents. For example, consider the sense line 30 which represents the digit 1. By following the line 30 from left to right, it first links four cores 44 corresponding to combinations equal to the digit the winding represents, then one core corresponding to the combination equal to one less than the digit it represents, and thence links three cores 44 again corresponding to combinations equal to one less than the digit it represents. Thus, assuming that the $A_1$ and $B_2$ input drivers were selected, the core 44 at the intersection of these two drivers would switch to provide a one unit of positive voltage on the sense lines 28 and 34 which are tied to the common lines 38 and 36, respectively. Simultaneously, the output drivers $\overline{A}$ and $\underline{B}$ are activated to apply signals to the logic stages 12, 14 and 16 and a reset signal to the carry driver 18. As described above, it is then the function of the logic states 14 and 16 to negate one or the other of the output signals while the function of the stage 12 is to provide one unit of negative voltage to the carry line 33 of the FIG. 1 in the absence of a carry from the previous addition. The carry line 22 employed with this embodiment of the matrix 10 is not shown but is subsequently described in detail with reference to the FIG. 3*b*.

Figure 3A:
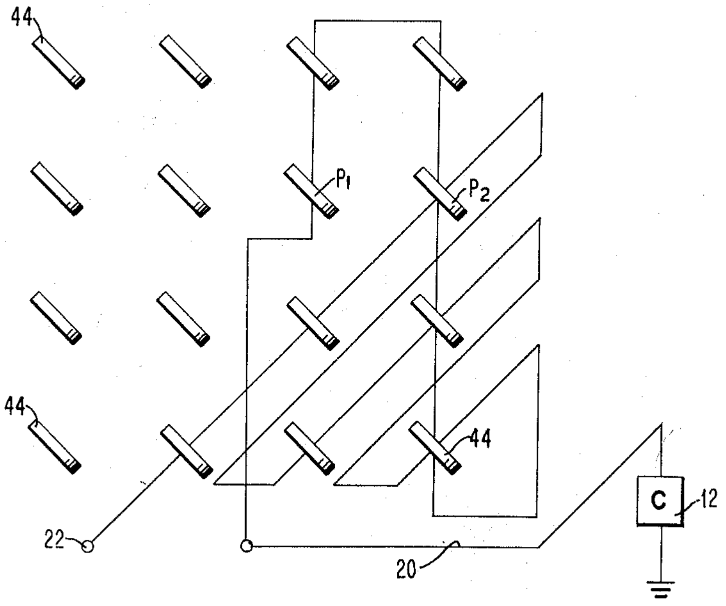
Figure 3B:
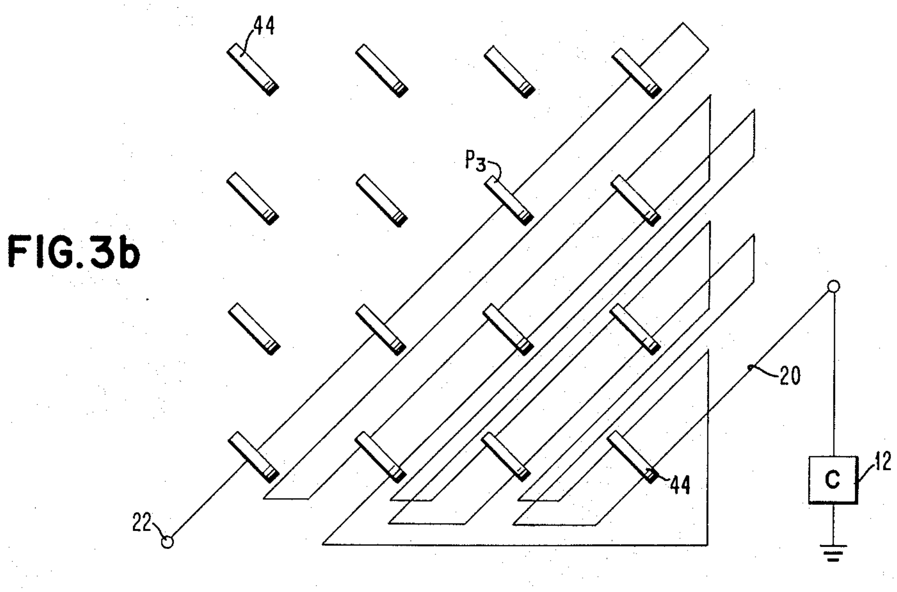

Referring to the FIGS. 3*a* and 3*b*, the winding arrangement for the carry sense line 22 shown in the FIG. 1 with respect to the input driver embodiments of FIGS. 2*a* and 2*b*, respectively, is illustrated. The cores 44 correspond to the arrangement of FIGS. 2*a* and 2*b* are repeated in the FIGS. 3*a* and 3*b*, respectively, with the carry sense line 22 linking the cores 44 as shown for each embodiment. In the FIG. 3*a*, assuming an input drive of $A_1$ and $B_2$ which, according to the FIG. 2*a* switches the cores at the intersection of the row corresponding to the $B_2$ drive and the columns corresponding to the $A_1$ and $A_2$ drives, one unit of positive voltage is developed in the carry line 22, corresponding to the next higher digit of the sum of the inputs A and B. Thus, if there has been a carry from the last addition, a further carry is indicated, while if there has been no carry from the last addition, the line 20 of the carry logic stage 12 provides a one-unit negative voltage which cancels the carry for this addition. It should be noted, however, that in the particular cases where the input combinations are $B_0$ and $A_2$, or $B_1$ and $A_2$ a unique condition exists due to the input drive employed. In the case where the inputs are $B_0$ and $A_2$, the cores 44 indicating either an output digit 2 on the sense line 32 or an output digit 3 on the sense line 34 are switched. In this case, whether there has been a carry from the last addition or not does not call for a further carry signal, and therefore the sense winding 20 links these cores in series opposition. The carry line 22, however, must link the core corresponding to the digit 3 for the case when the inputs are $B_0$ and $A_3$ to provide a carry signal if the previous addition included a carry. The same reasoning is applied to the case where the inputs are $B_1$ and $A_2$, where the carry line 22 must link the core corresponding to the digit 3 for the case where the inputs are $B_1$ and $A_3$. It is further appreciated that in those cases where the combinations of the inputs A and B are equal to or greater than the radix R, two cores 44 are linked by the carry winding 22 in an aiding sense to provide two units of positive voltage which overcome the one-unit negative voltage applied by the logic stage 12 when there is no carry from the previous addition.

In the FIG. 3*b*, the carry sense line 22, links the cores 44 whose combination of inputs are equal to or greater than the radix R, here the radix four, to induce two units of positive voltage on the line 22, and further links those cores 44 whose combinations are equal to the radix R minus one $(R-1)$, to induce one unit of positive voltage on the line 22. One side of the carry line 22 which is connected to the carry logic stage 12 via the line 20 is provided with one unit of negative voltage when there has been no carry from the previous addition. Thus, where the combination of inputs is equal to $(R-1)$, a carry output is provided if there has been a previous carry, and for those combination of inputs equal to or greater than the radix R, a carry output is provided whether a carry from the previous addition is indicated by the absence of a unit negative voltage from the carry logic stage 12, or if a no carry is indicated by the presence of the one unit negative voltage.

In each of the FIGS. 2*a*, 2*b*, 3*a* and 3*b*, the reset line 42 has been omitted for clarity since it is academic that such a winding would link each core in the matrix 10. It will become clear, after the complete details of the embodiments of this system have been digested that bistable cores need not be employed for the matrices described above since a negating signal on one of the common odd or even output lines is provided instantaneously necessitating only saturable type material with adequate biasing means for the matrix so that selection by coincident currents is necessitated to provide an output indication.

Referring to the FIG. 4, a detailed circuit diagram of the delay stage 24 and the carry driver stage 18 of the FIG. 1 is shown, wherein the carry line 22 is connected to an amplifier 46, which responds to positive voltages only. An output line 48 of the amplifier 46 is provided series connected with a primary winding 50 on a bistable magnetic core 52, through a current driver 54. A reset winding 56 is also provided on the core 52 connected with the reset driver 40 via the line 42 as shown in the FIG. 1. The core 52 is also provided with an output winding 58 connected to an input winding 60 on a further bistable magnetic core 62, through a diode $D_1$, and to a resistor $R_1$. The core 62 is provided with a reset winding 64 having one end connected to the resistor $R_1$ and the other connected to the input drive lines $\underline{A}$, $\overline{A}$, $\underline{B}$ and $\overline{B}$ as shown in FIG. 1. An output winding 66 is also provided on the core 62 connected to an inductance 68, through a diode $D_2$, a resistor $R_2$ and the line 26 as is shown in the FIG. 1.

Assuming a positive carry signal is provided on the line 22, during a first addition, and both the cores 52 and 62 are in a datum stable state, this signal is applied to the winding 50 on the core 52, by means of the amplifier 46 and driver 54, which switches the core 52 to an opposite, or information representing, stable state. The core 52 in switching induces a voltage on the winding 58 which tends to cause a current flow through the reverse direction of the diode $D_1$ and is thus dissipated by the high back impedance of the diode $D_1$. The reset driver 40, in the FIG. 1, then operates to direct a reset pulse into winding 56 via the line 42, on the core 52 and switch the core 52 to the datum stable state. The core 52 in switching induces a voltage on the winding 58 which causes a current flow through the diode $D_1$, the winding 60 on the core 62 and the resistor $R_1$ to ground. Energization of the winding 60 at this time causes the core 62 to switch from the datum to an opposite stable state and in so doing, to induce a voltage on the winding 66 which tends to cause a current flow through the high back resistance of the diode $D_2$ and is thus dissipated. After termination of the reset pulse, the input signals A and B, to the matrix 10 of the FIG. 1, are initiated for the next addition to direct a current pulse through the reset winding 64 on the core 62, the resistor $R_1$ and thence to ground. Energization of the winding 64 causes the core 62 to be switched to the datum stable state and cause a voltage to be induced on the windings 60 and 66. The voltage on the winding 60 and that across the resistor $R_1$ are opposed, negating any detrimental retograde transfer. The voltage on the winding 66 causes a current flow through the diode $D_2$ to provide a current pulse on the line 26 signifying a carry from the last addition. The inductor L and resistor $R_2$ serve to reduce spurious output pulses which may occur when the core 62 is in the datum state and a reset signal is applied. Thus, a carry initiated by a first addition is stored in the core 52 and thereafter transferred to the core 62 when the system is reset. Upon initiation of the next addition, the core 62 is read out and reset to provide a signal on the line 26 to denote a carry from the previous addition.

Referring to the FIG. 5, a simplified diagram of the digit sense lines 28, 30, 32 and 34 and their connections to the busses 36 and 38 is shown. The digit sense lines 30 and 34 are shown bussed to the line 36 which terminates in the even logic stage 14, labeled E, while the digit sense lines 28 and 32 are shown bussed to the line 38 which terminates in the odd logic stage 16, labeled O. As stated above, when the even logic stage 14, labeled E, or the odd logic stage 16, labeled O, is active, a negative signal is generated which cancels the positive signal on one of the digit sense lines 28, 30, 32 or 34.

When the logic stages 14 or 16 are activated by the combinations of inputs $\underline{A}$, $\bar{A}$, $\underline{B}$, $\bar{B}$ and a carry from the previous addition symbolized by *Cp*, is shown by way of a truth table in the FIG. 6. The truth table of FIG. 6 shows a column for the inputs $\underline{A}$, $\bar{A}$, $\underline{B}$, $\bar{B}$ and *Cp* and for the stages E and O, with activation of a particular input designated by a cross, "X," and activation of the stage E or O similarly designated.

In the FIG. 1, the logical stage 12 is required to provide a negative signal on the line 20 when there is no carry from the previous addition while the logical stage 14 is required to develop a negative signal on the line 36 to suppress the odd output signal generated in the matrix 10, depending upon the input combination and carry designation from the last addition, and the logic stage 16, similar to the stage 14, is required to deliver a negative signal on the line 38 to suppress the even output signal generated in the matrix 10, which is also dependent upon the input combination and carry designation from the previous addition. The requirements dictated of the stages 12, 14 and 16 may be attained by utilizing a variety of logical devices, some of which will be described below in detail.

Referring to the FIG. 7, an idealized magnetization curve of the type material employed is illustrated in each of three curves, labeled (*a*), (*b*) and (*c*), which comprises a plot of flux density B versus applied field H. Such material is commonly referred to as rectangular loop material and is characterized in having a positive and a negative limiting state of residual flux density. The negative limiting state is arbitrarily referred to as "N" while the positive state is referred to as "P." When the material has a field applied which switches it from one to another of the limiting states, a large flux change takes place which induces a correspondingly large voltage in a sense winding linking the material, and when such a material has a field applied tending to switch the material to the same limiting state in which it is already in, a small flux change takes place and a correspondingly small, or negligible, voltage is induced in the sense winding. Further, such type material must have a predetermined field applied thereto before switching takes place, designated as points *e* and *f* on the curves, which is commonly referred to as the "switching threshold" of the material.

Referring to the curve (*a*) of the FIG. 7, if a single applied field signal input were regulated to provide half the field necessary to reach the threshold *f* then three such signal inputs are required to switch the material providing the logical three-input gate circuit. Referring to curve (*b*) of FIG. 7, if each applied input field were greater than the threshold *f* of the material and two input signals apply negative fields while one applies a positive field, then, assuming the material to be in the N state, an output is sensed if, and only if, the single input which applies a positive field is present. Referring to the curve (*c*) of the FIG. 7, if each input signal applied a field just short of the threshold *f* of the material, and two input signals apply a positive field while one applies a negative field, then, assuming again the material is in the N state, an output is induced only when both positive field applying inputs are present. Since there are eight possible combinations; i.e. $\underline{AB}C_p$, $\bar{A}\underline{B}C_p$, $\underline{A}\bar{B}C_p$, $\overline{AB}C_p$, $\underline{AB}C_n$, $\bar{A}\underline{B}C_n$, $\underline{A}\bar{B}C_n$ and $\overline{AB}C_n$, where $C_p$ designates a carry and $C_n$ designates no carry from the last addition; the desired functions of the stages 12, 14 and 16 may be accomplished by providing eight toroidal cores made of rectangular loop material all of which may function as designated by the logic described for the curve (*a*) or (*b*) or (*c*) of FIG. 7. It has been found, however, that by using a combination of the logic described above for the curves (*b*) and (*c*) of FIG. 7, a simpler winding arrangement is possible and all the possible inputs are not needed.

Referring to the FIG. 8, a preferred toroidal core embodiment for accomplishing the logic of the stages 12, 14 and 16 of the FIG. 1 is shown, wherein a plurality of bistable magnetic toroidal cores 70 are provided having a plurality of input windings 72, 74, 76 and 78, corresponding to the inputs $\underline{A}$, $\underline{B}$, $C_p$ and $\bar{A}$, respectively, which interlink certain ones of the cores 70 in combination. Each of the cores 70 is designated by the reference (*b*) or (*c*) to denote the logic performed in accordance with applied fields of the curves (*b*) and (*c*) of the FIG. 7. Each of the cores 70 is linked and reset to the N state by means of the reset winding 42.

The combinatorial arrangement of the lines 72, 74, 76 and 78 which link the cores 70, manifests one of the eight possible input conditions set forth above by switching one of the cores 70. The one input combination manifested by the particular core 70 in switching is shown at its left, and it should be noted that although the driver $\bar{B}$ is not employed, the logic performed is dictated by its absence. To understand this type logic, consider the second core 70 from the top, wherein the logical expression $\underline{A}\bar{B}C_p$ is manifested. Since this core 70 operates in accordance with the logic of FIG. 7(*c*), and switches when the input lines $\underline{A}$ and $C_p$ are energized and the input $\underline{B}$ is not, the logical function realized must be $\underline{A}\overline{B}C_p$ since, when considering the matrix configuration of FIGS. 2*a* and 2*b* it was seen that one of the drive lines $\underline{A}$ or $\overline{A}$ and one of the drive lines $\underline{B}$ or $\overline{B}$ must be activated for every addition.

Referring to FIG. 9, the cores 70 of FIG. 8 are shown wherein the lines 20, 36 and 38 are shown linking the cores 70 in a predetermined combination. The line 20 has a one-unit negative pulse induced thereon when the input condition $\underline{AB}C_n$, $\overline{AB}C_n$, $\overline{A}\underline{B}C_n$ or $\underline{A}\overline{B}C_n$ is realized; the line 36 has a two-unit negative pulse induced thereon when the input condition $\underline{AB}C_n$, $\underline{A}\overline{B}C_p$, $\overline{A}\underline{B}C_p$ or $\overline{AB}C_n$ is realized, while the line 38 has a two-unit negative pulse induced thereon when the input condition $\overline{A}\underline{B}C_n$, $\overline{AB}C_p$, $\overline{A}\underline{B}C_p$ and $\underline{A}\overline{B}C_n$ is realized. The lines 36 or 38 provide a two-unit negative pulse when activated to insure full cancellation of the one-unit positive signal generated in the matrix 10 of the FIG. 1. A one-unit negative pulse could have been provided on the lines 36 or 38 when activated, but for obvious reasons of close regulation and noise, cancellation is insured by providing a two-unit negative pulse.

In order to provide a complete understanding of the operation of the system with the various embodiments disclosed, a typical addition will be traced with reference to the FIGURES 1–9. Operation will be described with the assumption that the signal from the reset pulse generator 40 has terminated and all elements are in a datum, or reset, state.

Assume the input drivers $A_2$ and $B_1$ energized. The matrix 10, according to the embodiments of FIGS. 2*a* and 2*b*, provides an output signal on the output sense lines 34 and 28 which are connected at one end to the odd and even bus 36 and 38, respectively. In the matrix of FIGS. 2*a* and 3*a*, an output is provided on the sense lines 34 and 28 by the switching of one core 44 at the intersection of the column $A_2$ and the row $B_1$ and one core 44 at the intersection of the column $A_3$ and the row $B_1$ which cores are labeled $P_1$ and $P_2$, respectively. In the matrix of FIGS. 2*b* and 3*b*, an output is provided on the sense lines 34 and 28 by switching the core 44 at the intersection of the column $A_2$ and the row $B_1$, which core is labeled $P_3$ for clarity. The drivers $\underline{A}$ and $\overline{B}$ are thus energized to apply inputs to the logic stages 12, 14 and 16. According to the truth table of FIG. 6, with the drivers $\underline{A}$ and $\overline{B}$ energized, if there has been no carry from the previous addition, the logical stage 16 is activated to negate the output signal on the sense line 28, while if there has been a carry from the previous addition, the logic stage 14 is activated to negate the output signal on the sense line 34. Further, it is the function of the logic stage 12 to provide a one-unit negative signal on the line 20 when there has been no carry from the previous addition and an absence of signal when there has been a previous carry.

Considering the embodiment disclosed in FIGS. 8 and 9 of the logic stages 12, 14 and 16, with the drivers $\underline{A}$ and $\overline{B}$ energized when there is no carry from the previous addition, the core 70 at the lower end of the vertical line of cores is switched to an active, i.e. the P, stable state. Referring to the FIG. 8, the line 72, corresponding to the driver $\underline{A}$ is energized which links the first three cores at the top and the last core. The first three cores are switched in accordance with the logic of FIG. 7(*c*) and necessitate two inputs to cause switching, while the last core is switched in accordance witth the logic of FIG. 7(*b*) which necessitates that only a specific one of three possible inputs be energized to cause switching. Since the drivers $\underline{B}$ and $C_p$, corresponding to the lines 74 and 76, are not energized, the last core 70 is switched. Referring to the FIG. 9, switching of this core induces an output signal on the odd logic output line 38, in accordance with the truth table of FIG. 6, and induces an output signal on the carry logic output line 20 to provide a one-unit negative signal to the matrix 10 indicating an absence of a carry from the previous addition. If, however, there has been a carry from the previous addition, the line $C_p$, corresponding to the line 26 in the FIG. 1 and the line 76 in the FIG. 7 is energized at this time. With the lines $\underline{A}$ and $C_p$ energized, the core 70, second from the top, is switched to the P or active state. The line $C_p$ links each of the cores 70 and, according to the logic indicated, either that of FIG. 7(*b*) or 7(*c*), the only other cores susceptible of switching are the cores operating in accordance with the logic of FIG. 7(*b*), and the fourth and last core from the top operate in accordance with the logic of FIG. 7(*b*) which are linked by the driver $C_p$ such that a negative, or inhibiting, field is set up within the core driving the core further into saturation in the N state. Switching of the core 70, second from the top, induces an output signal on the even logic output line 36, in accordance with the truth table of FIG. 5, leaving the carry logic output line 20 unactivated to indicate a carry from the previous addition to the matrix 10.

Assuming an absence of carry from the previous addition, the odd logic output line is activated to negate the output signal on the sense line 28 and a negative impulse is provided on the carry logic output line 20 which is connected to the carry output line 22. In the FIG. 3*a*, the cores 44, labeled $P_1$ and $P_2$ have been switched and the carry line 22 links the core $P_2$ twice thus having a two-unit position signal inducted therein, while the same line 22 links the core $P_1$ once in an opposite sense, to induce a one-unit of negative signal thereon. Since, as indicated above, a one-unit negative signal is provided on the line 22 by the logic stage 12, via the carry logic output line 20, the algebraic sum of these signals is effectively zero, indicating a no carry condition. Considering the matrix 10 of the FIG. 3*b*, only the core 44, designated as $P_3$, has been switched and the carry sense line 22 which links the core $P_3$ once has induced thereon a one-unit positive signal. Since the stage 12 has generated a one-unit negative signal on the line 20, connected to the sense line 22, the sum of these signals is zero indicating a no carry condition.

Assuming a carry from the previous addition, the even logic output line 36 is provided with an inhibiting signal to the sense line 34 and there is no signal induced on the carry logic output line 20, as discussed above with reference to the FIGS. 8 and 9. In the matrix 10 of FIGS. 2*a* and 3*a*, the cores $P_1$ and $P_2$ were switched and the carry sense line 22, in the FIG. 3*a*, links the core $P_2$ twice in one sense and the core $P_1$ once in an opposite sense. The sum of the induced signals on the carry line 22 provides a positive signal since there is an absence of cancelling signal from the line 20, indicating a carry condition. This carry indication is registered in the delay stage 24. In the matrix 10 of the FIGS. 2*b* and 3*b*, only the core $P_3$ has been switched to induce a positive carry signal on the line 22, indicating a carry condition, which signal is registered in the delay stage 24. Thus, the system is seen to operate for both embodiments of the matrix 10 with the embodiment of FIGS. 8 and 9.

In describing another embodiment for accomplishing the logic of stages 12, 14 and 16 of FIG. 1 reference is made to a copending application, Serial Number 619,199, filed October 30, 1956, in behalf of Ray T. Kickosima, which is assigned to the assignee of this application. In this copending application, a multipath bistable magnetic core structure comprising a core member having a number of pierced openings at points along its longitudinal axis is disclosed, wherein the openings are located in the center of the main circular flux path through the core defining an inner and an outer flux path. With the material of the core established in a datum stable state, by means of a reset winding embracing the total cross-section of the core so that the flux is oriented in a counterclockwise direction, signal inputs are applied to the structure by means of windings which thread the holes and embrace the outer flux path. In such a structure, two basic principles govern the switching phenomena. The first principle is that when, with the entire core initially saturated in one direction, counter-clockwise, a magnetomotive force is applied either to the inner or outer half of the core such that the flux produced is in opposition to the initial direction of flux, flux reversal takes place in the inner portion of the core. When the applied magnetomotive force produces flux in the same direction as the initial, counter-clockwise, direction, no flux reversal occurs. An extension of this first principle is the second which may be stated as when, with the core initially saturated in one direction, counter-clockwise, and magnetomotive forces are applied to either the inner or outer half of the core at several different locations on the core, flux reversal takes place in the inner half of the core if, and only if, the flux produced by at least one of the applied magnetomotive forces is in a direction and of sufficient magnitude to cause localized switching in opposition to the initial saturation.

By employing a similar structure and the principles set forth above, a device made up of two such multipath bistable magnetic core structures may be fabricated which is capable of performing the logic of the stages 12, 14 and 16 of the FIG. 1.

Referring to the FIG. 10, a first bistable magnetic multipath core 100 is provided having a number of apertures 102, 104, 106, 108, 110 and 112. A similar core 100′ is provided having similar apertures 102′, 104′, 106′, 108′, 110′, and 112′. The drive lines A, $\bar{A}$, B $\bar{B}$ and 26, where the line 26 designates a carry from the last addition in FIG. 1 and is referred to as $C_p$, link the apertures of the cores 100 and 100′ in a combinatorial fashion to manifest one of the eight possible input conditions set forth above by causing localized switching in opposition to the main flux of the core, about the aperture linked. The combination manifested by localized switching is indicated adjacent the aperture and again, the logic performed is dictated by the absence of a possible input and in accordance with the driving conditions set forth with reference to FIG. 7(*b*). Consider, for example, the logic $A\bar{B}C_n$, performed in the core 100 by locally switching the flux about the aperture 102. In order to cause switching of the outer flux path adjacent the aperture 102, of the three input drives, A, $\bar{B}$ and $C_p$, switching occurs if, and only if, the input A is actuated, and the logic performed by each of the openings 102, 104, 106 and 108 of the core 100 and the openings 102′, 104′, 106′ and 108′ of the core 100′ is seen to be in conformity with the FIG. 7(*b*). Manifestation of the input combination is provided by the line 38 which links the core 100 by threading the aperture 112 and embracing the inner flux path in accordance with the principles set forth in the aforementioned copending application. Similarly, the output line 36 links the aperture 112′ of the core 100′. It should be noted that the output line 20, also links the aperture 110 of the core 100 as does the input drive line $C_p$ in opposition to cancel noise induced in the output line 20. A similar aperture 110′ is provided on the core 100′ and is shown only to demonstrate that either one or the other may be employed for the same purpose. Each of the cores 100 and 100′ are linked by the reset line 42, as shown in the FIG. 1, to establish a counter-clockwise direction of flux in the cores. Thus a logical device comprising a pair of multipath core elements may be fabricated to work in conjunction with the matrix 10 of FIG. 1, shown in the embodiments of FIGS. 2*a*–3*b*, to perform the logic of the stages 12, 14 and 16.

Utilization of the embodiment of FIG. 10 in conjunction with the structures of FIGS. 1–3*b* is best understood by way of example, and the marginal input condition considered above will again be demonstrated. Assume the input condition $A_2$ and $B_1$. The matrix 10 of FIG. 1, according to the embodiment of FIGS. 2*a* and 3*a* and FIGS. 2*b* and 3*b* provides an output signal on the output sense lines 34 and 28 which are connected at one end to the odd and even bus line 36 and 38, respectively. As above, the cores $P_1$ and $P_2$ are switched in the matrix of FIGS. 2*a* and 3*a*, while the core $P_3$ in the matrix of FIGS. 2*b* and 3*b* is switched. The drivers A and $\bar{B}$ are activated and applied to the logic stages 12, 14 and 16 of FIG. 1 which, according to the table of FIG. 6 activates the stage 16 to negate the output on line 28 in the absence of a carry from the previous addition or activates the stage 14 to negate the output on the line 34 when a carry from the previous addition is indicated. It is the function of the stage 12 to provide a negative signal on the line 20 in the absence of a carry from the previous addition and no signal on the line 20 when a carry is indicated from the previous addition.

Considering the embodiment of FIG. 11 for the logical stages 12, 14 and 16, the A driver threads through the openings 102, 104 and 106 of the core 100′ and the opening 108′ of the core 100′. The driver $\bar{B}$ threads through the opening 108 of the core 100 and the opening 108′ of the core 100′. Since the logic performed at each of the openings of the cores 100 and 100′ is in accordance with that set forth in FIG. 7(*b*), and the A driver applies a positive field about the opening 102 of the core 100 and a negative field is applied by both the A and $\bar{B}$ drivers about the remaining apertures linked, switching will occur about the opening 102 of the core 100 in the absence of a carry from the previous addition. The opening 102 of the core 100 is linked by the driver A in one sense and the drivers $\bar{B}$ and $C_p$ in an opposite sense. Thus, if a carry indication is provided by the energization of the line 26, the driver $C_p$, switching will not take place about the opening 102 of the core 100. The driver $C_p$ not only threads the opening 102 of the core 100 but also the openings 104, 106, 108 and 110 of the core 100 and the openings 102′, 104′, 106′, and 108′ of the core 100′ to provide a positive field about the openings 106 and 108 of the core 100 and 106′ and 108′ of the core 100′. The openings 106 and 108 of the core 100 have a negative field applied by the drivers A and $\bar{B}$, respectively, while the opening 108′ of the core 100′ has a negative field applied thereto by both the drivers A and $\bar{B}$, leaving the path about the opening 106′ of the core 100′ with only the field applied by the driver $C_p$. Thus, in the absence of a carry from the last addition, the material about the opening 102 of the core 100 has its direction of flux reversed. Switching the direction of flux about the opening 102 of the core 100 is inhibited when a carry from the last addition is indicated, and the flux direction about the opening 106′ of the core 100′ is switched. When there is no carry indication, an output is developed in the odd logic output line 38 which threads through the opening 112 of the core 100 and embraces the inner flux path of the core. If there has been a carry indication, an output is developed in the even logic output line 36 which threads the opening 112′ of the core 100′.

The carry logic output line 20, labeled $C_n$, threads through the openings 102, 104 and 110 of the core 100 and the openings 102′ and 104′ of the core 100′. Thus, in the absence of a carry indication from the last addition a negative signal is induced on the output line $C_n$, while a carry indication provides no output signal on this line.

Operation of the system with the inputs $A_2$ and $B_1$ employing the embodiment of FIG. 10 for the logic stages 12, 14 and 16, has provided a negating output signal on the odd logic output line 38 and a one-unit negative signal on the carry logic output line 20 in the absence of a carry indication, or, a negating output signal on the even logic output line 36 when the carry driver $C_p$, the line 26, is energized. The outputs provided under the conditions set forth are seen to be the same as those of the embodiment of FIGS. 8 and 9 above, providing operability and compatibility with the system and embodiments of the FIGS. 1–3.

FIG. 11 represents a further embodiment of this invention for the matrix 10 of the FIG. 1 constructed in accordance with the principles set forth in the above-mentioned copending application. A core 120, 122, 124, 126 and 128 is provided where the cores 120, 122, 124 and 126 have an input opening 130, 132, 134 and 136 and an output opening 138. The core 128 is provided with an input opening 140, 142 and 144 and an output opening 146. The four input drive lines for each input A and B link the input openings of the cores 120, 122, 124 and 126 so that each opening is coupled by one A and one B driver, while the input openings of the core 128 are linked by predetermined ones of the input drivers A and B so that the driver $A_3$ links all the input openings of the core, the driver $A_2$ links the input openings 142 and 144, and the driver $A_1$ links the openings 144 only. With the exception of the driver $B_0$, one B driver links one input opening only of the core 128. The A input drivers link the outer flux path of the cores to cause a counter-clockwise flux direction about the opening linked when energized, while the B input drivers link the inner flux paths of these cores to cause a clockwise flux direction about the opening linked when energized. Outputs for each of the cores are developed by a separate winding linking the opening 138 of the cores 120, 122, 124 and 126 and the opening 146 of the core 128, embrace only the outer flux path of the core. The sense windings 28, 30, 32 and 34 of the matrix of FIG. 1 which are bussed at one end to form the sense odd bus 36 and the sense even bus 38, which terminate in the even and odd logic stages 14 and 16, respectively, are provided for the cores 120, 122, 124 and 126. The output sense line 28 threads through the opening 138 of the cores 120 and 126, while the output sense line 30 threads through the opening 138 of the cores 120 and 122 and the output sense line 32 threads through the opening 138 of the cores 122 and 124 and the output sense line 34 threads through the opening 138 of the cores 124 and 126. The configuration of the output sense lines 28, 30, 32 and 34 is such that upon actuation of an output in one sense line denoting one digit, the next highest digit sense line is also provided with an output signal in accordance with the system matrix 10 of the FIG. 1. Further, the output opening 146 of the core 128 is threaded twice by the carry sense line 22, which also threads the output opening 138 of the core 126 and is connected to the carry logic stage 12 via the line 20. Each of the cores are reset before energization of the input drivers A and B by means of the reset line 42, which links the entire cross-section of each core and causes the cores to assume a counter-clockwise direction of flux remanence.

In accordance with the first and second principles, stated previously in describing the operation of FIG. 10, energization of any one of the input drivers is effective to establish a localized field of saturation around the opening for which it is positioned. These localized fields are established in the clockwise direction when any one of the A input drivers is energized and in the counter-clockwise when any one of the B input drivers are energized. Thus, when an input signal is applied separately to any one of the input drivers, a localized field of saturated flux is established around the opening through which that driver is positioned and the flux in the inner flux path in the portion of the core remote from the opening is reversed. Since the output windings embrace only the outer flux path, no significant output is developed and the same is true if both windings positioned through the same hole and respectively engaging both the inner and the outer flux path at that point are not energized coincidently. For example, all four B input drivers may be coincidently energized, in which event, conditions of substantial flux saturation in a counter-clockwise direction are established around the openings linked and only the inner flux path in the portion of the core remote from these openings is reversed. The same is true when all the A input drive lines or combinations thereof are energized coincidently, the only difference being in the direction of the saturated flux around the opening.

When, however, with the cores 120—128 reset in the remanence counter-clockwise direction, the input drivers A and B, which respectively embrace the inner and outer flux paths at the same location, are energized coincidently, each applies a magnetomotive force in a different direction to the localized path around the opening. As a result, the magnetomotive forces, which are both clockwise with respect to the longer inner and outer flux paths around the core, are applied to these paths, a flux reversal is experienced throughout the circular length of both the inner and outer flux paths. Since any one of the output windings link the outer flux path of the core, an output voltage is then induced on this winding and an output signal is produced. This flux reversal throughout the core is effective when signals are applied to two input drivers which respectively embrace the inner and outer portions of the core at the same location, regardless of whether or not inputs are applied at the same time to one or more of the other drivers. Thus, the logic defined by switching of the direction of flux of one core is a two-input AND function for each of the input openings of the cores. This embodiment of the matrix 10 of FIG. 1 is seen to require less elements and is capable of faster operation since there is no limitation on the magnitude of the drives. This embodiment is also capable of operating with the embodiment of FIGS. 8 and 9 or the embodiment of FIG. 10 for the logic stages 12, 14 and 16 of the system of FIG. 1. The operability and compatibility of the embodiment of FIG. 11 may best be understood by considering operation of the system with the drivers $A_2$ and $B_1$ energized in accordance with the sample operation described above.

Referring to the FIG. 11, the input driver $A_2$ is threaded through the opening 134 of the core 120, the opening 136 of the core 122, the opening 130 of the core 124, the opening 132 of the core 126 and the openings 142 and 144 of the core 128, while the input driver $B_1$ threads through the opening 132 of each of the cores 120, 122, 124 and 126 and the opening 140 of the core 128. Since the logic necessitated to provide an output indication is the two-input AND function at any one opening, only the opening 132 of the core 126 meets this condition. The total flux within the core 126 is then switched to provide a signal output on the output sense lines 34 and 28, which have one end connected to the odd and even logic output lines 36 and 38, respectively, and a one-unit positive signal output on the carry sense line 22. It may be seen therefore that the embodiment of FIG. 11 meets the requirements of the system of FIG. 1 and provides the correct output indications which, with reference to the previous examples described above, is readily perceived.

It should be noted that the core 128 is here employed to provide a two-unit positive signal on the carry line 22 where the true sum of the inputs is equal to or greater than the radix R indicating a carry whether there is a carry from the previous addition or not, while the output indication on the carry line 22 provided by the core 126 switching represents the marginal condition where the sum of the inputs A and B is equal to $(R-1)$ where R is the system radix.

In summation, the system of FIGURE 1 may be constructured by employing a matrix 10 of the embodiments of FIGS. 2*a* and 3*a*, or FIGS. 2*b* or 3*b*, or of the FIG. 11 in combination with the embodiment of FIGS. 8 and 9 or FIG. 10. To employ toroidal magnetic cores for either the matrix 10 or the logic stages 12, 14 and 16, close regulation of the magnitude of the input drivers must be adhered to and consequently limited switching speeds of the elements and thus the system is evidenced. When, however, the embodiment of FIG. 11 is employed with the embodiment of FIG. 10, higher magnitudes of drives may be utilized since switching of these elements depends upon coincident flux principles, allowing faster switching and hence higher system speeds. Further, as the system radix R is made larger, the number of bistable devices of the embodiments of FIGS. 2*a* and 3*a* or FIGS. 2*b* and 3*b* is increased since $R^2$ devices are necessitated. Considering the embodiment of FIG. 11, the number of multipath elements necessary for summation is R, each of which have R input openings, and only one other multipath element for carry which has $(R-1)$ input openings. Thus for the embodiment of FIG. 11, from a manufacturing standpoint, for any desired radix R we need provide $(R+1)$ multipath elements having $(R+1)$ openings and the extra opening of the core employed for carry need not be utilized. Thus the logic system of FIG. 1 may be constructed of multipath elements of the FIGS. 10 and 11 by employing only $R+3$ multipath elements in distinction to the large number of elements necessary for only the matrix of FIGS. 2*a* and 3*a* or FIGS. 2*b* and 3*b* which required $R^2$ bistable devices.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A computing system comprising a matrix of bistable devices, said matrix having input and output means coupled to each said device, said input means comprising a first and second group of input lines having predetermined ones bussed at one end to form a first and second set of common input lines, the devices of said matrix being responsive to the energization of said input lines to provide a plurality of output signals on said output means, and further means coupled to said sets of common input lines responsive to the energization of said first and second group of input lines for inhibiting one of said output signals.

2. In a computing system, a matrix of bistable devices, said matrix having input and output means coupled to each said device, said input means comprising a first and second group of input lines having predetermined ones bussed at one end to form a first and second set of common input lines, the devices of said matrix being responsive to the energization of said first and second group of input lines to provide a first and a second output signal in said output means, and further means coupled to said sets of common input lines responsive to the energization of said first and second group of input lines for inhibiting one of said output signals.

3. In a computing system employing the radix R, a matrix of $R^2$ bistable devices, said matrix having input and output means coupled to each said device, said input means comprising a first and second group of input lines having predetermined ones bussed at one end to form a first and second set of common input lines, means for energizing said input means to establish two of said devices in an activated state so that a first and a second output signal is provided in said output means, and further means coupled to said sets of common input lines responsive to the energization of said input means for inhibiting one of said output signals.

4. In a computing system employing the radix R, a matrix of $R^2$ bistable devices, said matrix having input and output means coupled to each said device, said input means comprising a first and second group of input lines having predetermined ones bussed at one end to form a first and second set of common input lines, the devices of said matrix being responsive to the energization of said input means to provide a first and a second output signal in said output means, and further means coupled intermediate said first and second set of common input lines and output means responsive to the energization of said input means for simultaneously inhibiting one of said output signals.

5. In a computing system employing the radix R, a matrix of $R^2$ bistable magnetic cores, said matrix having input and output means coupled to each said core, said input means including a first and a second group of R input lines, said first group of input lines having predetermined ones bussed at one end to form a first set of common input lines, said second group of input lines having predetermined ones bussed at one end to provide a second set of common input lines, means for establishing said cores in a first stable state, two of said cores responsive to the energization of said input means to switch to a second stable state and provide a first and a second output signal in said output means, and further means coupled intermediate said sets of common input lines and said output means responsive to the energization of said sets of common input lines for inhibiting one of said output signals.

6. In a computing system employing the radix R, a matrix of $R^2$ bistable magnetic cores, said matrix having a first and a second group of R input lines coupled to said cores, said first and second groups of input lines having predetermined ones bussed at one end to form a first set of common input lines and a second set of common input lines, said output means including R output lines having predetermined ones bussed at one end to form a set of common output lines, two of said cores being responsive to the energization of said input means to provide a first and second output signal in a first and a second one of said R output lines, and further means responsive to the energization of said first and second sets of common input lines for energizing one of said common output lines whereby one of the output signals on said R output lines is inhibited.

7. In a system employing the radix R, a matrix of $R^2$ bistable devices, said matrix having input and output means coupled to each said device, said input means comprising a first group of R input lines and a second group of R input lines, said first and second groups of input lines having predetermined ones bussed at one end to form a first set of common input lines and a second set of common input lines, said output means including R output lines having predetermined ones bussed at one end to form a set of common output lines, the bistable devices of said matrix being responsive to the energization of said input means to provide a plurality of output signals on said R output lines, and further means coupled intermediate said first and second sets of common input lines and said set of common output lines responsive to the energization of said first and second sets of common input lines for energizing one of said common output lines whereby one of the output signals on said R output lines is inhibited.

8. In an arithmetic system employing the radix R, a device for the addition of information representing input signals comprising a matrix of $R^2$ bistable magnetic cores, said matrix having input and output means coupled to each said core, said input means comprising a first group and a second group of R input lines having predetermined ones bussed at one end to form a first and a second set of common output lines, said output means including R output lines having predetermined ones bussed at one end to form a set of common output lines comprising a first common output line for manifestation of the true sum of said input signals and a second common output line for the manifestation of the true sum of said input signals plus one, the cores of said matrix being responsive to the energization of said input means to provide an output signal on the first and second common output lines, and further means coupled intermediate the first and second sets of common output lines and said set of common output lines responsive to the energization of said input means for inhibiting the output signal on one of said common output lines.

9. In a system employing the radix R, a device for the addition of numbers comprising a matrix of bistable devices, said matrix having input and output means coupled to each said device, said output means comprising R output lines bussed at one end to form a first and a second set of common output lines and a further output line for manifestation of a carry signal, delay means coupled with said further output line for storing said carry signal, the bistable devices of said matrix responsive to the energization of said input means to provide an output signal in a first and a second one of said R output lines, further means including said delay means coupled to said first and second set of common output lines responsive to the energization of said input means for inhibiting the output signal on either said first or second one of said R output lines.

10. A device capable of adding numbers in a system employing the radix R comprising, a matrix of $R^2$ bistable devices, said matrix having a first group of R input lines coupled to each said device coded to represent a first number to be added and a second group of R input lines coupled to each said device coded to represent a second number to be added, said first group of R input lines having predetermined ones commoned at one end to provide a first set of commoned input lines, said second group of R input lines having predetermined ones commoned at one end to provide a second set of commoned input lines, said matrix having R output lines coupled to each said device having predetermined ones commoned to a first common output line and the remaining ones commoned to a second commoned output line and a further output line coupled to predetermined ones of said devices for manifesting a carry signal for the addition of said numbers, delay means coupled to said further output line for storing said carry signal, the devices of said matrix being responsive to the energization of said first and second group of R input means to coincidently provide a first output signal on one of said R output lines indicative of the sum of the numbers added and a second output signal on another one of said R output lines indicative of the sum of the numbers added plus one, and further means including said delay means coupled to said first and second set of commoned input lines and said first and second common output lines responsive to the energization of said sets of commoned input lines to provide a signal on one of said common output lines whereby one of the output signals on said R output lines is inhibited.

11. In an adder system adapted to provide a true sum or a true sum plus carry output indication, an adder stage having input and output means, said input means comprising a first and second group of input lines having predetermined ones bussed at one end to form a first and second set of common input lines, said stage including means coupled by said first and second group of input lines responsive to the energization of said input means to provide two output signals on said output means one of which is indicative of the sum and the other of which is indicative of the sum plus carry, and further means coupling said first and second set of common input lines responsive to the energization of said input means for inhibiting one of said output signals.

12. In an adder system employing the radix R adapted to provide a true sum or a true sum plus carry output indication, an adder stage having input and output means, said input means comprising a first and a second group of R input lines, predetermined ones of which are bussed at one end to form a first and second set of common input lines, said stage including means responsive to the energization of said input means to provide two output signals on a first and second one of said output means indicative of the sum and the sum plus carry respectively of a first and a second number to be added, and further means coupling said first and second set of common input lines responsive to the energization of said input means for selecting one of said output signals.

13. In an adder system employing the radix R which is adapted to provide a true sum or a true sum plus carry output indication, an adder stage having input and output means, said output means including R output lines having predetermined ones bussed at one end to form a first and a second set of common output lines, said stage including means responsive to the energization of said input means to provide an output signal on two of said R output lines one of which is indicative of the sum and the other of which is indicative of the sum plus carry, and further means responsive to the energization of said input means and coupled to said first and second set of common output lines for inhibiting one of said output signals.

14. In an adder system employing the radix R which is adapted to manifest either a sum or a sum plus carry output indication of information signal inputs, an adder stage having input and output means, said input means comprising a first and a second group of R coded input lines predetermined ones of which are bussed at one end to form a first and a second predetermined set of common input lines, said output means including R coded output lines having predetermined ones bussed at one end to form a first and a second set of common output lines, said stage including means responsive to the energization of said input means to provide two output signals on said R output lines one of which is indicative of the sum and the other of which is indicative of the sum plus carry of said signal inputs, and further means coupled intermediate said first and second predetermined set of common input lines and said first and second set of common output lines responsive to the energization of said first and second group of input lines for inhibiting one of said output signals.

15. The adder of claim 13, wherein the radix R employed is equal to $2n$, where $n$ is a digit greater than one, and each of said first and second group of R coded input lines are bussed to form a pair of even coded and a pair of odd coded input lines.

16. The adder of claim 14, wherein each of said coded R output lines is bussed to form a set of even coded output lines and a set of odd coded output lines.

17. An adder capable of manifesting a sum or sum plus one output indication comprising a plurality of magnetic bistable multipath elements each of which has a plurality of input openings and one output opening, input means comprising a plurality of input lines threaded through said input openings in a predetermined combination, a plurality of output lines threaded through said output openings, said elements responsive to the energization of said input means to provide an output signal on one of said output lines indicative of sum and a further output on a further one of said output lines indicative of sum plus one, and further means responsive to the energization of said input means to inhibit one of said output signals.

18. A logical circuit comprising a plurality of bistable devices, a plurality of input and output means coupled to each said device, each one of said output means coupled to two of said devices, one of said devices responsive to a predetermined energization of said input means to simultaneously provide a first and a second output signal in a first and a second one of said output means, and further means responsive to the energization of said input means to inhibit one of said output signals.

19. A circuit as set forth in claim 18 wherein certain ones of said plurality of output means are commonly connected to provide a first and a second set of common output means and said further means is coupled to said sets of common output means.

20. A circuit as set forth in claim 19 wherein a further one of said plurality of output means is coupled to a delay means for storing a predetermined output signal and said further means includes said delay means.

21. In a system employing the radix R, a computing circuit comprising R+ one magnetic bistable multipath elements each having input and output means wherein R elements have R coded input openings and one output opening and said one element has (*R*—1) input openings, said input means comprising a first group of R input lines and a second group of R input lines, the R input openings of said R elements linked by one of said first group of input lines and one of said second group of input lines, the input openings of said one core linked by predetermined ones of said first and second group of input lines, said output means including a plurality of output lines each of which link the one output opening of one of said R elements and the one output opening of the succeeding element, means for establishing said elements in a first stable state, means for energizing said input means to establish one of said R elements in a second stable state and provide a first and a second output signal on said output means, and further means responsive to the energization of said input means for inhibiting one of said output signals.

22. A circuit as set forth in claim 21 wherein said output means includes an output winding threading the output opening of said one element and the output opening of one of said R elements.

23. A sequentially operated circuit comprising a plurality of bistable devices, input means comprising a first and second group of input lines coupled to each said device with predetermined ones of said input lines bussed at one end to form a first and second set of common input lines, output means coupled to each said device, said bistable devices being responsive to the energization of said input means in each sequence of operation to provide a first and a second output signal in a first and a second one of said output means, storage means for storing a manifestation of the energization of said input means in a first sequence of operation of said device, and further means including said storage means coupled to said first and second sets of common input lines responsive to the energization of said input means in a second sequence of operation for inhibiting one of said output signals.

24. A sequentially operated circuit comprising a plurality of magnetic cores, input and output means coupled to each said core, said input means comprising a first and second group of input lines having predetermined ones bussed at one end to form a first and second set of common input lines, said cores being responsive to the energization of said input means to provide an output signal on each of a plurality of said output means in each sequence of operation, storage means coupled to a further one of said plurality of output means having an output signal provided thereon for storing a predetermined manifestation of the energization of said input means in a first sequence of operation, and further means including said storage means coupled to said first and second sets of common input lines responsive to the energization of said input means in a second sequence of operation for inhibiting one of said output signals.

25. A sequentially operated device for performing arithmetic operations in a system employing the radix R comprising, a matrix of $R^2$ bistable magnetic cores, said matrix having input means comprising a first group of R input lines for manifestation of a first number to be added and a second group of R input lines for manifestation of a second number to be added coupled to each said core, said first and second groups of R input lines having predetermined ones commonly connected to form sets of commonly connected input lines, said matrix having output means comprising R output lines coupling each said core wherein predetermined ones are commonly connected to form sets of commonly connected output lines and a further output line coupling predetermined ones of said cores, said cores being responsive to the energization of said input means to provide an output signal on a plurality of said R output lines in every sequence of operation, storage means for storing a manifestation of the energization of said input means in a first sequence of operation of said device coupled to said further output line, and further means including said storage means coupled to said groups of commonly connected output lines responsive to the energization of said commonly connected input means in a second sequence of operation to provide an output signal on one of said commonly connected output lines whereby one of the output signals on said R output lines is inhibited.

References Cited in the file of this patent

UNITED STATES PATENTS 2,364,540 Luhn ------------------- Dec. 5, 1944

UNITED STATES PATENT OFFICE
CERTIFICATE OF CORRECTION

Patent No. 3,018,961 January 30, 1962

Robert L. Ward

It is hereby certified that error appears in the above numbered patent requiring correction and that the said Letters Patent should read as corrected below.

Column 7, line 30, for "retograde" read -- retrograde --; column 10, line 33, for "position signal inducted" read -- positive signal induced --.

Signed and sealed this 11th day of September 1962.

(SEAL)
Attest:

ERNEST W. SWIDER
Attesting Officer

DAVID L. LADD
Commissioner of Patents